(12) United States Patent
Yamasaki et al.

(10) Patent No.: US 8,374,753 B2
(45) Date of Patent: Feb. 12, 2013

(54) STARTING DEVICE OF OCCUPANT PROTECTIVE SYSTEM

(75) Inventors: Shigenaga Yamasaki, Hyogo (JP); Toshiyuki Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 702 days.

(21) Appl. No.: 12/521,898

(22) PCT Filed: Jan. 8, 2008

(86) PCT No.: PCT/JP2008/050074
§ 371 (c)(1),
(2), (4) Date: Jul. 1, 2009

(87) PCT Pub. No.: WO2008/126423
PCT Pub. Date: Oct. 23, 2008

(65) Prior Publication Data
US 2010/0023225 A1    Jan. 28, 2010

(30) Foreign Application Priority Data
Apr. 9, 2007    (JP) .................................. 2007-101899

(51) Int. Cl.
*G06F 19/00*    (2006.01)
*G08B 21/00*    (2006.01)
(52) U.S. Cl. ........... 701/45; 340/667; 280/735; 180/182
(58) Field of Classification Search ................. 701/36, 701/45, 47, 35, 49; 280/734, 735, 282, 271, 280/290; 340/665, 666, 667, 671; 180/271, 180/290, 282
See application file for complete search history.

(56) References Cited

U.S. PATENT DOCUMENTS

| | | | |
|---|---|---|---|
| 5,440,485 A | | 8/1995 | Okimoto et al. |
| 5,483,451 A | * | 1/1996 | Ohmae et al. .................... 701/46 |
| 5,515,276 A | | 5/1996 | Kura et al. |
| 6,005,485 A | * | 12/1999 | Kursawe et al. ............. 340/665 |
| 6,104,973 A | | 8/2000 | Sugiyama et al. |
| 2003/0005391 A1 | * | 1/2003 | Matsumoto et al. ............. 716/1 |
| 2003/0074111 A1 | | 4/2003 | Ugusa et al. |
| 2010/0282532 A1 | * | 11/2010 | Falkenstein ............. 180/65.265 |

FOREIGN PATENT DOCUMENTS

| | | |
|---|---|---|
| DE | 43 18 350 A1 | 12/1993 |
| DE | 195 13 646 A1 | 10/1995 |
| DE | 695 34 654 T2 | 7/2006 |
| JP | 5-330398 A | 12/1993 |
| JP | 7-27774 A | 1/1995 |
| JP | 9-104320 A | 4/1997 |
| JP | 11-192920 A | 7/1999 |
| JP | 2003-118532 A | 4/2003 |
| JP | 2006-327370 A | 12/2006 |
| JP | 2007-84007 A | 4/2007 |
| WO | WO-96/11125 | 4/1996 |

* cited by examiner

*Primary Examiner* — Ronnie Mancho
(74) *Attorney, Agent, or Firm* — Birch, Stewart, Kolasch & Birch, LLP

(57) ABSTRACT

A starting device of an occupant protective system includes an angular velocity or acceleration sensor 11 for detecting the behavior of a vehicle, processing sections 131 and 132 for performing two or more computations using different subtrahends on a physical quantity based on the output from the sensor 11, a comparing section 133 for comparing absolute values of outputs from the processing sections 131 and 132, a selecting section 134 for selecting the output value of the processing sections 131 and 132 with the minimum absolute value, and a decision section 135 for making a decision as to the necessity for starting the occupant protective system in accordance with the output value selected.

5 Claims, 9 Drawing Sheets

STARTING DEVICE OF OCCUPANT PROTECTIVE SYSTEM

TECHNICAL FIELD

The present invention relates to starting device of an occupant protective system such as an air bag.

BACKGROUND ART

A signal acquired from a sensor mounted on a vehicle usually includes a drift component, and the drift component sometimes exceeds a normal state temporarily because of environmental changes such as temperature. As for the effect of the drift component, when calculating the angle of the vehicle by integrating the output from an angular velocity sensor, there are some cases where the drift component is also integrated and hence causes a considerable error with respect to a real angle. Accordingly, it becomes necessary to eliminate the drift component from the angular velocity sensor as preprocessing of the integral.

Conventionally, to solve the foregoing problem, a drift correcting method has been known which extracts the drift component of the sensor signal from a vibration gyro or the like using a high frequency elimination filter, and eliminates it by subtracting from the sensor signal (see Patent Document 1, for example).
Patent Document 1: Japanese Patent Laid-Open No. 7-27774/1995.

According to the technique disclosed in Patent Document 1, although the drift component is eliminated, a subtrahend is small in the high frequency elimination filter set for the drift component from the sensor in a steady state. Accordingly, it has a problem of taking a considerable time to eliminate the drift component temporarily occurred because of the environmental changes.

Therefore it is necessary to increase the cutoff frequency and order of the high frequency elimination filter so as to increase the subtrahend up to such a level that enables suppression of the drift component.

However, setting the cutoff frequency and order at high offers a problem of bringing about an overshoot phenomenon in which the subtrahend becomes excessive with respect to the sensor output in the latter half of the output signal for a target physical phenomenon like a rollover.

In a starting device for activating an occupant protective system of the vehicle, when an overshoot is large, an overshoot component occurs in a right turn with respect to a rollover phenomenon of a left turn vehicle, for example. In this case, there is a possibility of erroneously starting the occupant protective system mounted on the vehicle for the right turn.

The present invention is implemented to solve the foregoing problems. Therefore it is an object of the present invention to provide a starting device of an occupant protective system capable of eliminating a drift component quickly for the drift component occurring temporarily owing to environmental changes, and capable of achieving offset elimination in such a manner as to prevent the overshoot in the latter half of the output signal for the target physical phenomenon.

DISCLOSURE OF THE INVENTION

To solve the foregoing problems, a starting device of an occupant protective system in accordance with the present invention includes: a sensor for detecting behavior of a vehicle; at least two processing sections for performing computations with at least two different subtrahends on a physical quantity based on the sensor output; a comparing section for comparing absolute values of outputs from the at least two processing sections; a selecting section for selecting an output value of the processing section with a minimum absolute value; and a decision section for making a decision as to necessity for starting the occupant protective system in accordance with the output value selected.

According to the present invention, the starting device of the occupant protective system can be provided which can quickly eliminate a drift component occurring temporarily owing to an environmental change, and to carry out offset elimination that will prevent an overshoot from occurring in the latter half of the output signal with respect to the target physical phenomenon.

BEST MODE FOR CARRYING OUT THE INVENTION

The best mode for carrying out the invention will now be described with reference to the accompanying drawings to explain the present invention in more detail.

Embodiment 1

Figure 1:
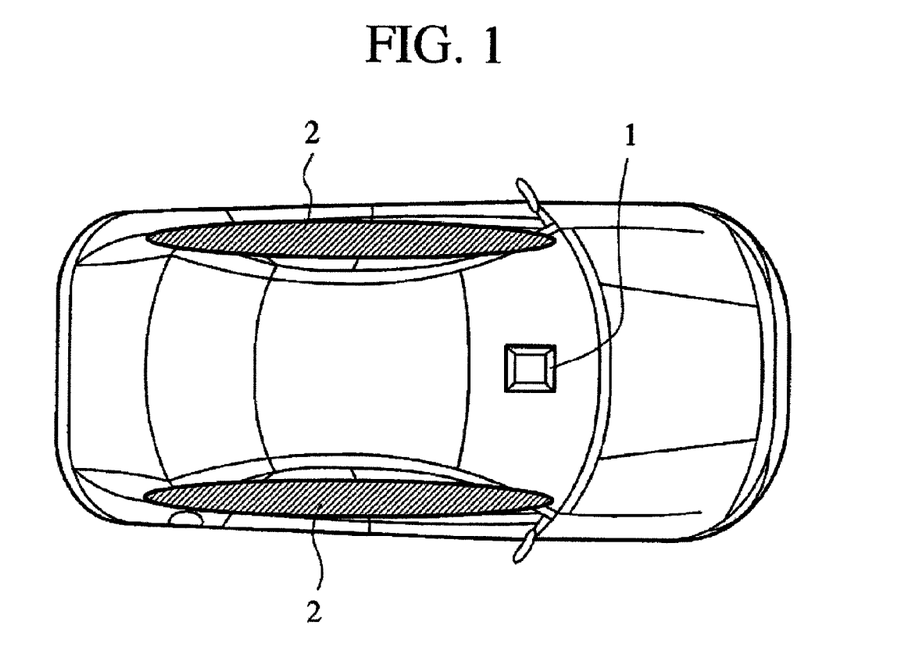
FIG. 1 is a view showing a mounting manner of a starting device of an occupant protective system of an embodiment 1 in accordance with the present invention when it is mounted on a vehicle.

FIG. 1 is a diagram showing a mounting manner of a starting device of an occupant protective system of an embodiment 1 in accordance with the present invention when it is mounted on a vehicle.

An air bag system serving as an occupant protective system for protecting an occupant at a rollover of a vehicle includes as shown in FIG. 1 a main ECU (Electronic Control Unit) 1 mounted at the center of the vehicle for carrying out starting control of an air bag, and air bags 2 mounted on both sides of the vehicle.

Figure 2:
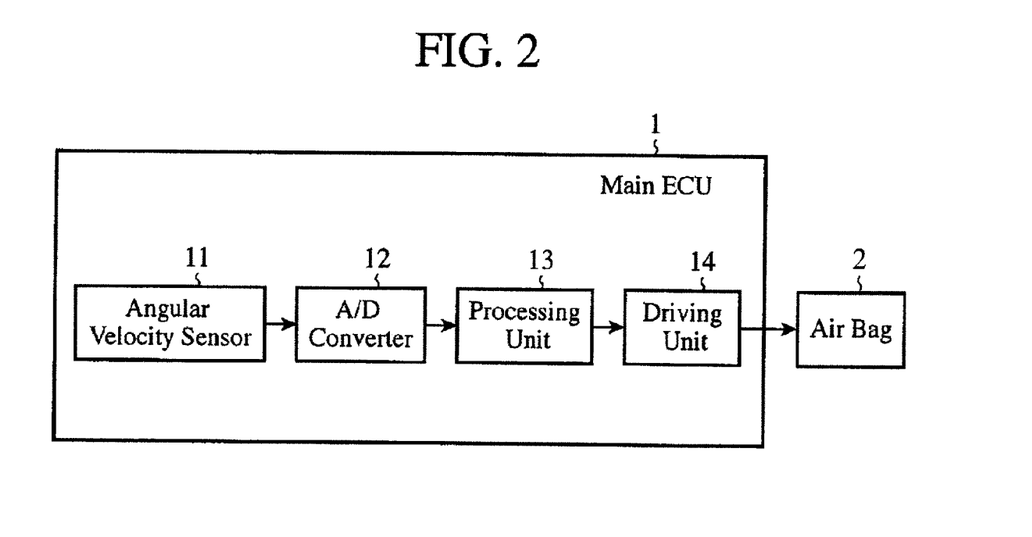
FIG. 2 is a block diagram showing an internal configuration of the starting device of the occupant protective system of the embodiment 1 in accordance with the present invention.

FIG. 2 is a block diagram showing an internal configuration of the starting device of the occupant protective system of the embodiment 1 in accordance with the present invention.

The starting device of the occupant protective system of the embodiment 1 in accordance with the present invention is mounted on the ECU 1 shown in FIG. 1, and includes an angular velocity sensor 11, an A/D (Analog/Digital) converter 12, a processing unit 13, and a driving unit 14.

In the configuration of FIG. 2, the angular velocity measured by the angular velocity sensor 11 is converted to a voltage signal, and then converted to a digital signal by the A/D converter 12. After that, the processing unit 13 composed of a microcomputer, for example, executes the computing processing which will be described later to make a decision on the magnitude of a rollover.

The processing unit 13 decides an ordinary rollover in accordance with an angle component θ obtained by a waveform integral of the angular velocity ω, and if the integral value exceeds a predetermined starting threshold, the driving unit 14 outputs a firing signal to activate the air bag 2.

Figure 3:
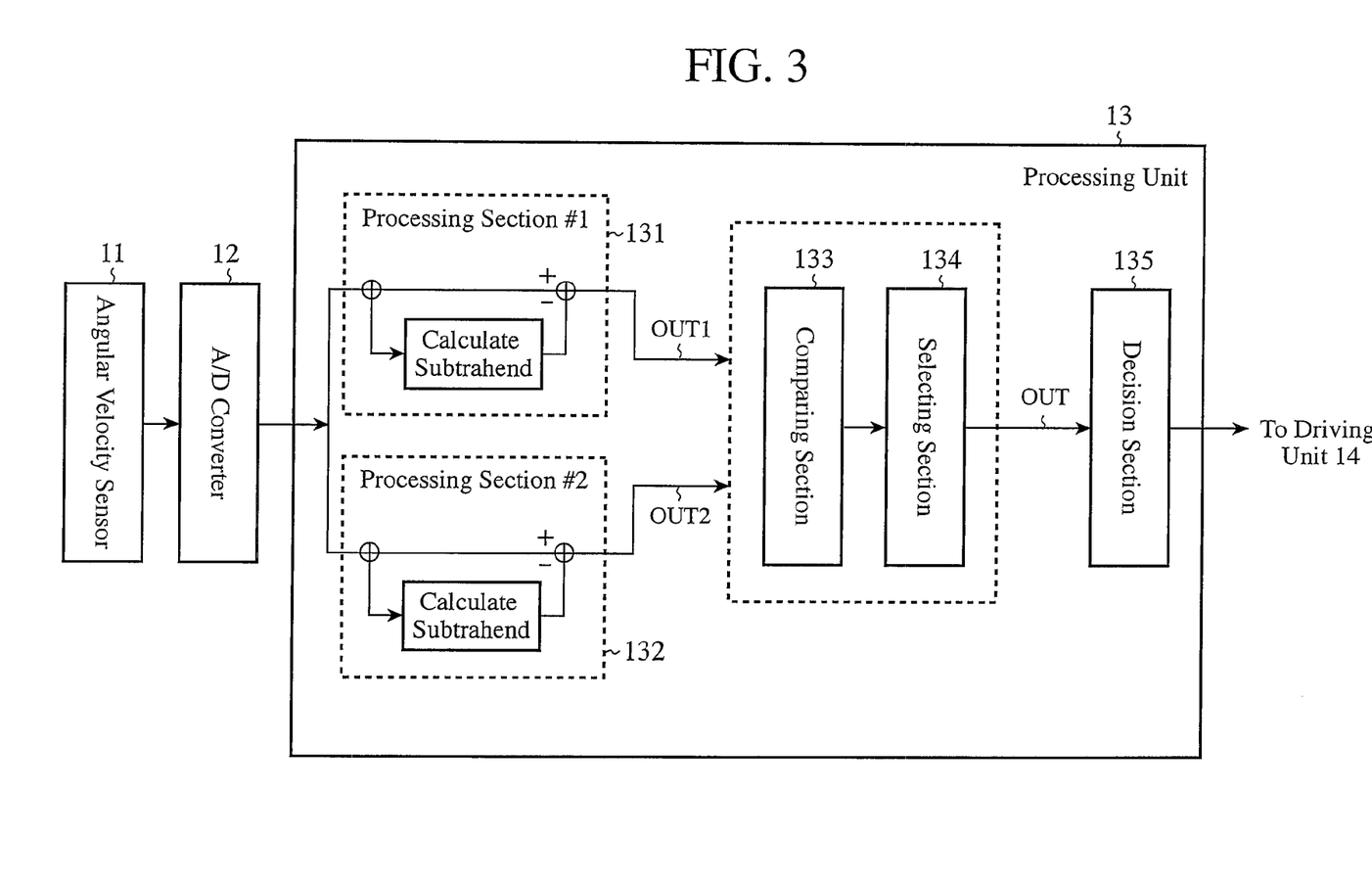
FIG. 3 is a block diagram showing an internal configuration of the processing unit shown in FIG. 2 by developing in accordance with functions.

FIG. 3 is a block diagram showing an internal configuration of the processing unit 13 shown in FIG. 2 by developing in accordance with its functions.

As its functional configuration is shown in FIG. 3, the processing unit 13 includes a processing section 131, a processing section 132, a comparing section 133, a selecting section 134, and a decision section 135.

In the foregoing configuration, first, the processing section 131 and processing section 132 carry out subtractions of two or more different subtrahends from an input (angular velocity) obtained from the angular velocity sensor 11 via the A/D converter 12, and output to a comparing section 133.

The comparing section 133 compares the absolute values of the values output from the processing section 131 and processing section 132, and supplies the result to the selecting section 134. The selecting section 134 selects the minimum absolute value from the absolute values compared by the comparing section 133, and outputs to the decision section 135. The decision section 135 makes a decision that a rollover occurs if the absolute value selected by the selecting section 134 exceeds a predetermined threshold (THR), and outputs a starting signal to the driving unit 14 connected.

Figure 4:
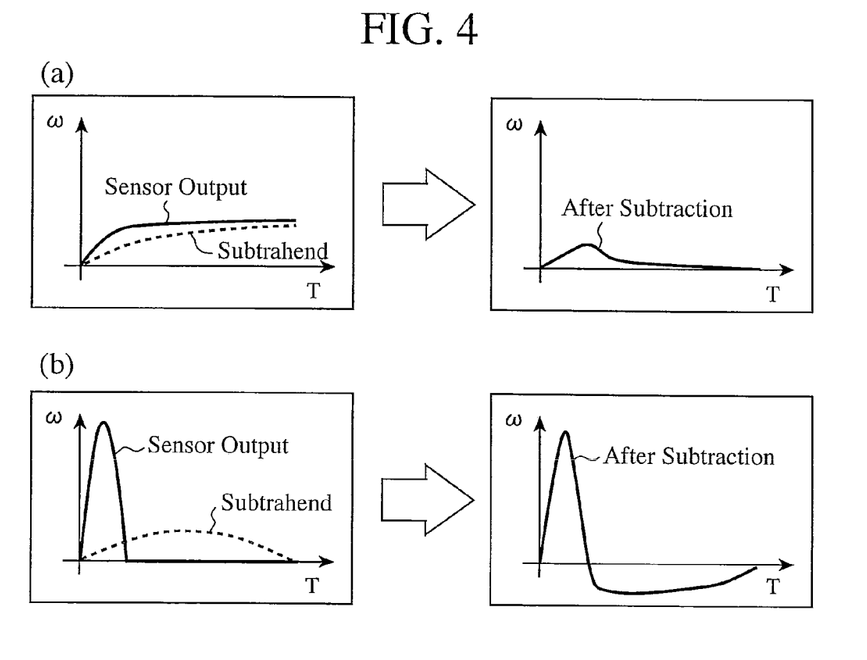
FIG. 4 is a diagram for explaining processing operation when using an LPF for extracting a low frequency component as processing sections shown in FIG. 3.

FIG. 4 is an operational schematic diagram for explaining processing operation when employing LPFs for extracting low frequency components as the processing section 131 and processing section 132 shown in FIG. 3.

FIG. 4(a) shows ω (angular velocity) versus T (time) characteristics when a drift component is superimposed on the angular velocity sensor 11: the left-hand side of the thick arrow shows a waveform before computation; and the right-hand side thereof shows a waveform after the computation.

As shown in FIG. 4(a), after a fixed time has elapsed, the subtrahend converges to the same value as the output of the angular velocity sensor 11 by the LPF processing. As shown on the right-hand side of the arrow, after the computing processing, the subtrahend is subtracted from the output of the angular velocity sensor 11, and it is found that the drift component is eliminated after the fixed time has elapsed.

FIG. 4(b) shows the operation when the vehicle rolls over. Since the LPF processing has a delay characteristic, as shown on the right-hand side of the arrow, an overshoot with a negative component, which is not included in the output of the angular velocity sensor 11, occurs after the subtraction. As for the subtrahend, it is assumed that the processing section 131 sets it at such a value that will enable eliminating the steady drift component and the processing section 132 sets it at such a value that will enable eliminating a temporarily large drift component by adjusting the cutoff frequency and order of the LPF in accordance with the time constant of the target drift phenomenon. Setting the cutoff frequency at high will reduce the output signal, and at low will increase the output signal as is publicly known.

Although the foregoing description is made as to the processing of subtracting the low frequency component the LPF produces from the output of the angular velocity sensor 11, it is obvious that the processing is equivalent to executing HPF processing for the output of the angular velocity sensor 11 directly.

Next, the subtraction will be described with reference to FIG. 5 and FIG. 6 when the processing section 131 and processing section 132 set their variations at a constant value.

Figure 5:
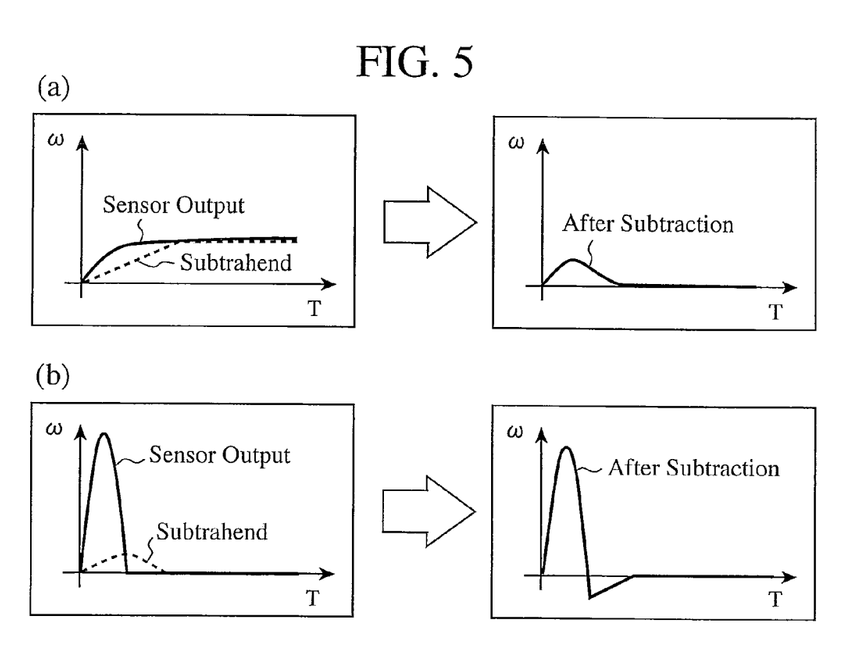
FIG. 5 is a diagram for explaining the processing operation when using an adder-subtracter for adjusting a subtrahend at a constant value as the processing sections shown in FIG. 3.

FIG. 5 is an operational schematic diagram for explaining the processing operation when employing adder-subtracters that set the subtrahends at fixed values as the processing section 131 and processing section 132 shown in FIG. 3. As FIG. 4, FIG. 5(a) shows relationships between ω (angular velocity) versus T (time) when a drift component is superimposed on the angular velocity sensor 11, and the left-hand side of the thick arrow shows a waveform before computation, and the right-hand side thereof shows a waveform after the computation.

Figure 6:
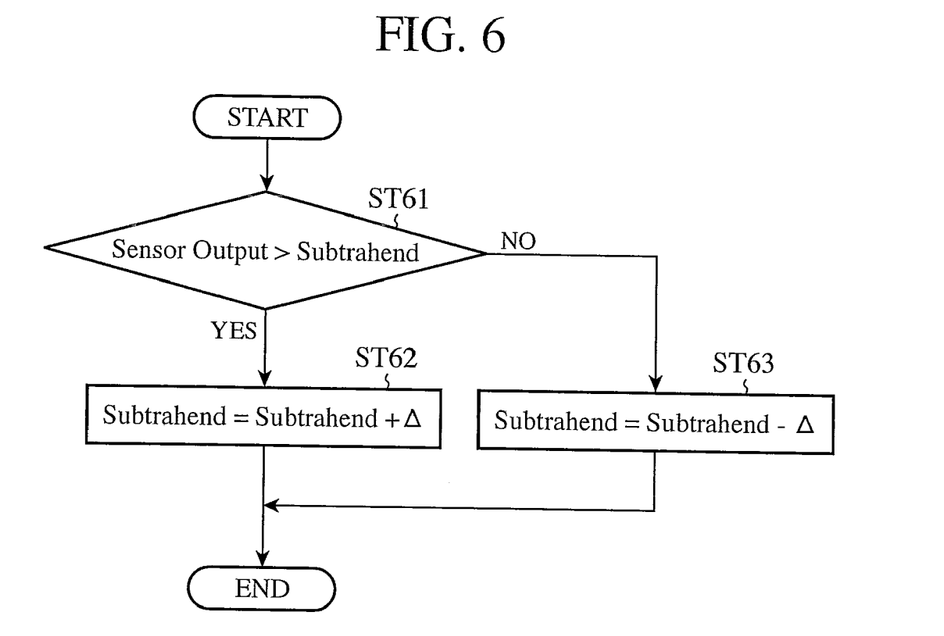
FIG. 6 is a flowchart showing a flow of computing processing of the starting device of the occupant protective system of the embodiment 1 in accordance with the present invention when a variation is made constant.

FIG. 6 is a flowchart showing a flow of the computing processing of the starting device of the occupant protective system of the embodiment 1 in accordance with the present invention when the variation is set at a fixed value.

As shown in FIG. 6, the processing section 131, for example, compares the output of the angular velocity sensor 11 with a fixed subtrahend set (step ST61). When the output of the angular velocity sensor 11 is greater than the subtrahend ("YES" at step ST61), a fixed value (Δ) is added to the subtrahend (step ST62). In contrast, when the output of the angular velocity sensor 11 is less than the subtrahend ("NO" at step ST61), the fixed value (Δ) is subtracted from the subtrahend (step ST63). The processing section 132 operates in the same manner as the processing section 131.

By setting the variation at a fixed value in this way, even if the input value associated with the rollover phenomenon is large, it becomes possible to inhibit excessive subtraction. Thus, it is effective when applied to the case where the amount of change of the drift component can be grasped in advance.

Therefore, switching, according to whether the amount of change of the drift component can be grasped in advance or not, between the type (using the LPFs), which varies the subtrahend in accordance with the magnitude of a physical quantity, and the method of using the fixed subtrahend defined in advance, offers an advantage of being able to inhibit the divergence of the output value even if the drift component greater than expected is input, and to prevent the excessive subtraction.

Figure 7:
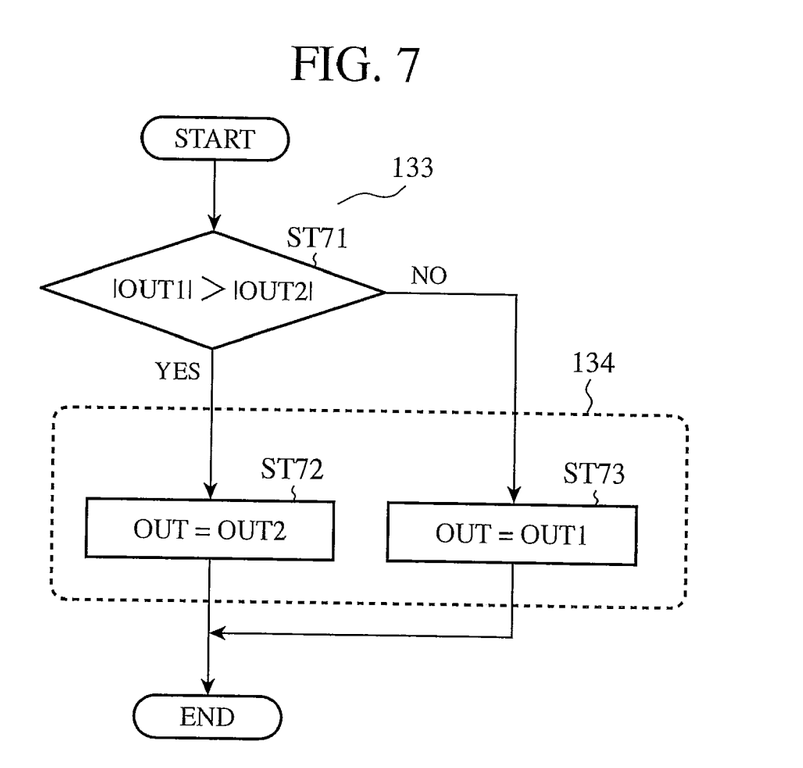
FIG. 7 is a flowchart showing a flow of comparing and selecting processing of a comparing section 133 and a selecting section 134 of the starting device of the occupant protective system of the embodiment 1 in accordance with the present invention.

FIG. 7 is a flowchart showing a flow of comparing and selecting processing of the comparing section 133 and selecting section 134 of the starting device of the occupant protective system of the embodiment 1 in accordance with the present invention.

As shown in the flowchart of FIG. 7, the comparing section 133 compares the absolute value of the subtraction output (OUT1) of the processing section 131 with the absolute value of the subtraction output (OUT2) of the processing section 132 (step ST71). The selecting section 134 selects the subtraction output (OUT) whose absolute value is minimum, and supplies it to the decision section 135. If |OUT1|>|OUT2| ("YES" at step ST71), the selecting section 134 selects the subtraction output OUT2 and supplies it to the driving unit 14 (step ST72). In contrast, if |OUT1|≦|OUT2| ("NO" at step ST71), it selects the subtraction output OUT1, and outputs it to the decision section 135 (step ST73).

Figure 8:
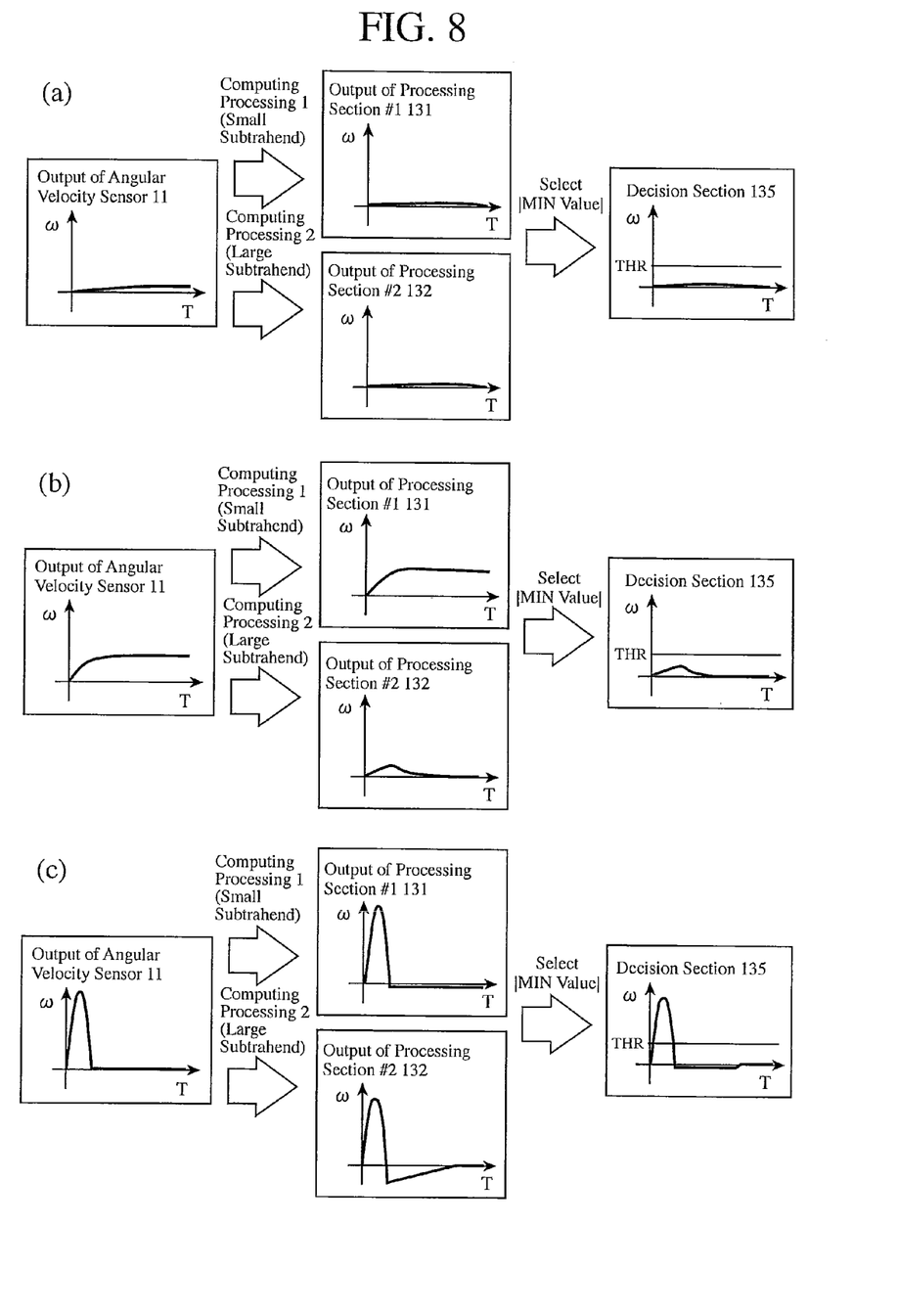
FIG. 8 is an operational schematic diagram illustrating the operation of the processing unit of the starting device of the occupant protective system of the embodiment 1 in accordance with the present invention.

FIGS. 8(a), 8(b) and 8(c) are operational schematic diagrams for explaining the operation of the processing unit 13 in the occupant protective system of the embodiment 1 in accordance with the present invention.

Referring to the operational schematic diagrams shown in FIGS. 8(a), 8(b) and 8(c), the operation of the processing unit 13 shown in FIG. 2 and FIG. 3 will be described in detail.

FIG. 8(a) shows the operation of the processing unit 13 in the steady state. Here, it shows that the drift component is eliminated by the processing unit 13 (comparing section 133 and selecting section 134) which compares and selects an output value with a smaller absolute value (|MIN value|) after the subtraction by the processing section 131 and processing section 132 (in this case, since the results of the subtraction do not have any significant difference, either output will do).

On the other hand, FIG. 8(b) shows the operation of the processing unit 13 when a temporary environmental change occurs. Here, it shows that offset is prevented from occurring by the processing unit 13 (comparing section 133 and selecting section 134) which compares and selects an output value with a smaller absolute value (|MIN value|) (selects the processing section 132) after the subtraction by the processing section 131 and processing section 132.

Furthermore, FIG. 8(c) shows the operation of the processing unit 13 when a physical event such as a rollover occurs. It shows as FIG. 8(b) that an overshoot is prevented from occurring by the processing unit 13 (comparing section 133 and selecting section 134) which compares and selects an output value with a smaller absolute value (|MIN value|) (selects the processing section 131 in the first half and the processing section 132 in the second half) after the subtraction by the processing section 131 and processing section 132.

According to the foregoing embodiment 1 in accordance with the present invention, the processing unit 13 executes the subtraction for two or more different subtrahends and selects the subtraction output with the minimum absolute value. This makes it possible to quickly eliminate the drift component occurring temporarily owing to an environmental change, and to carry out offset elimination that will prevent an overshoot from occurring in the latter half of the output signal with respect to the target physical phenomenon. Accordingly, it can provide a highly reliable occupant protective system.

Embodiment 2

Figure 9:
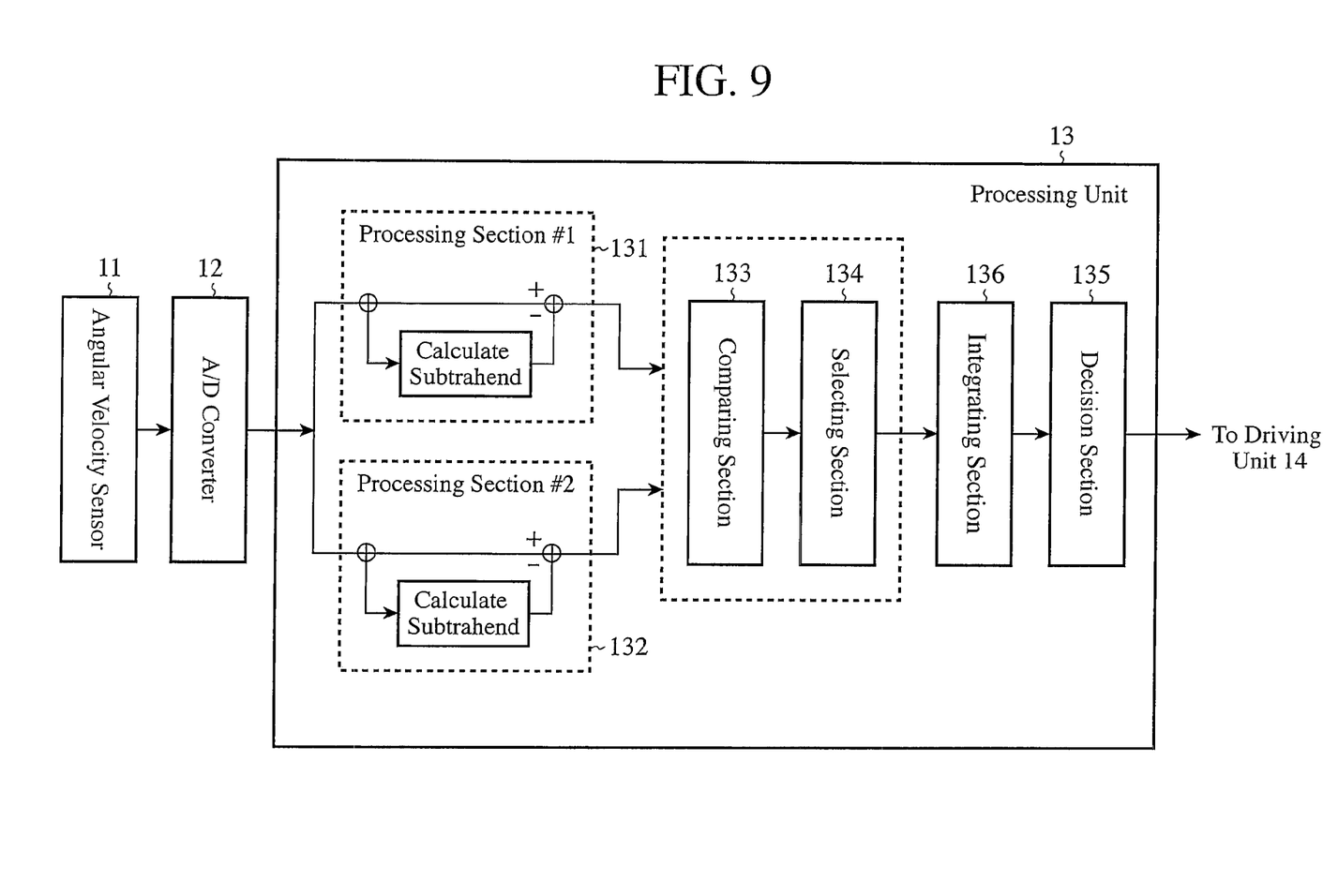
FIG. 9 is a block diagram showing by developing in accordance with functions an internal configuration of the processing unit of a starting device of an occupant protective system of an embodiment 2 in accordance with the present invention.

FIG. 9 is a block diagram showing an internal configuration of the processing unit 13 by developing in accordance with functions in the starting device of the occupant protective system of an embodiment 2 in accordance with the present invention.

It differs from the embodiment 1 shown in FIG. 3 in that it has an integrating section 136 added between the selecting section 134 and the decision section 135 for integrating the subtraction result selected by the selecting section 134. Since it has the same configuration as the embodiment 1 shown in FIG. 3 except for the insertion of the integrating section 136, only the integrating section 136 will be described below. Incidentally, in FIG. 8, blocks designated by the same reference numerals as the blocks of FIG. 3 are assumed to have the same names and functions as the blocks of FIG. 3.

Figure 10:
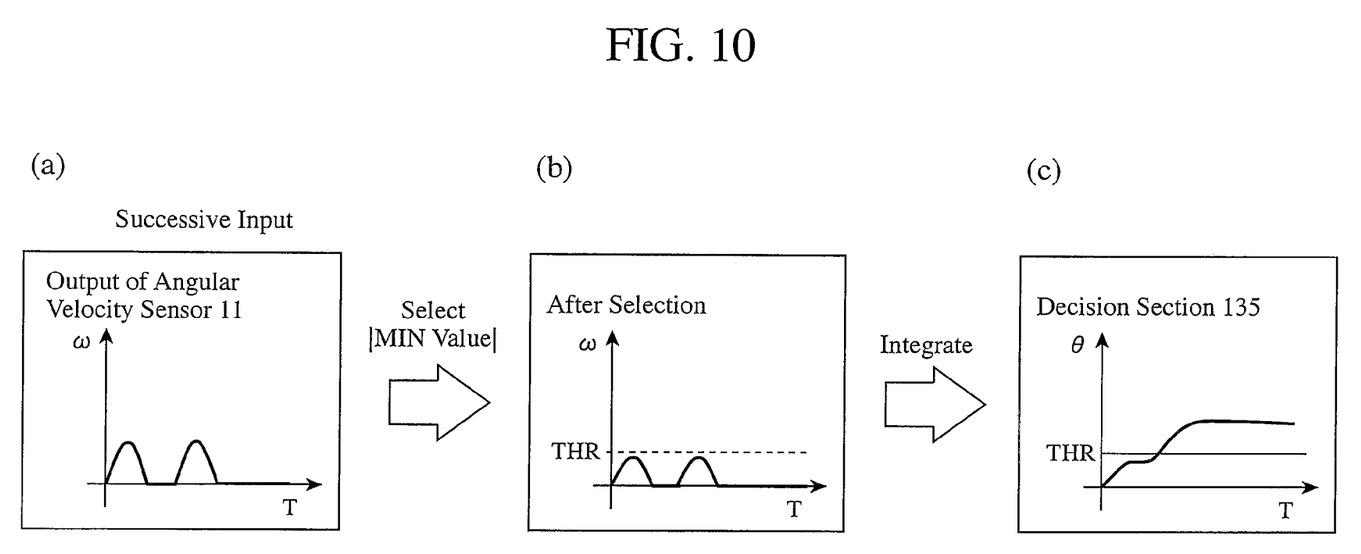
FIG. 10 is an operational schematic diagram showing a series of operations conceptually from an angular velocity sensor output to a starting decision by the processing unit shown in FIG. 9.

FIG. 10 is an operational schematic diagram showing a procedure from the output of the angular velocity sensor 11 to the starting decision of the air bag 2 by the decision section 135 conceptually as to the operation of the processing unit 13 shown in FIG. 9. Here, the description will be made assuming a case in which rollover phenomena occur successively in a multistep manner.

As described in the embodiment 1, when the comparing section 133 simply compares the subtraction output value ω of the processing section 131 with that of the processing section 132, the minimum value does not reach the starting threshold level of the occupant protective system singly as shown in FIG. 10(b) However, as shown in FIG. 10(c), the angle component θ will exceed the starting threshold (THR) level by the accumulation effect of integrating the subtraction output value supplied via the selecting section 134, which makes it possible to start the air bag 2 by the driving unit 14.

According to the starting device of the occupant protective system of the embodiment 2 in accordance with the present invention, the integrating section 136 integrates the value selected by the selecting section 134 and supplies to the decision section 135. This enables the air bag 2 to start because of the accumulation result of the physical quantity even in a case where the value selected does not reach the starting threshold singly.

Embodiment 3

Figure 11:
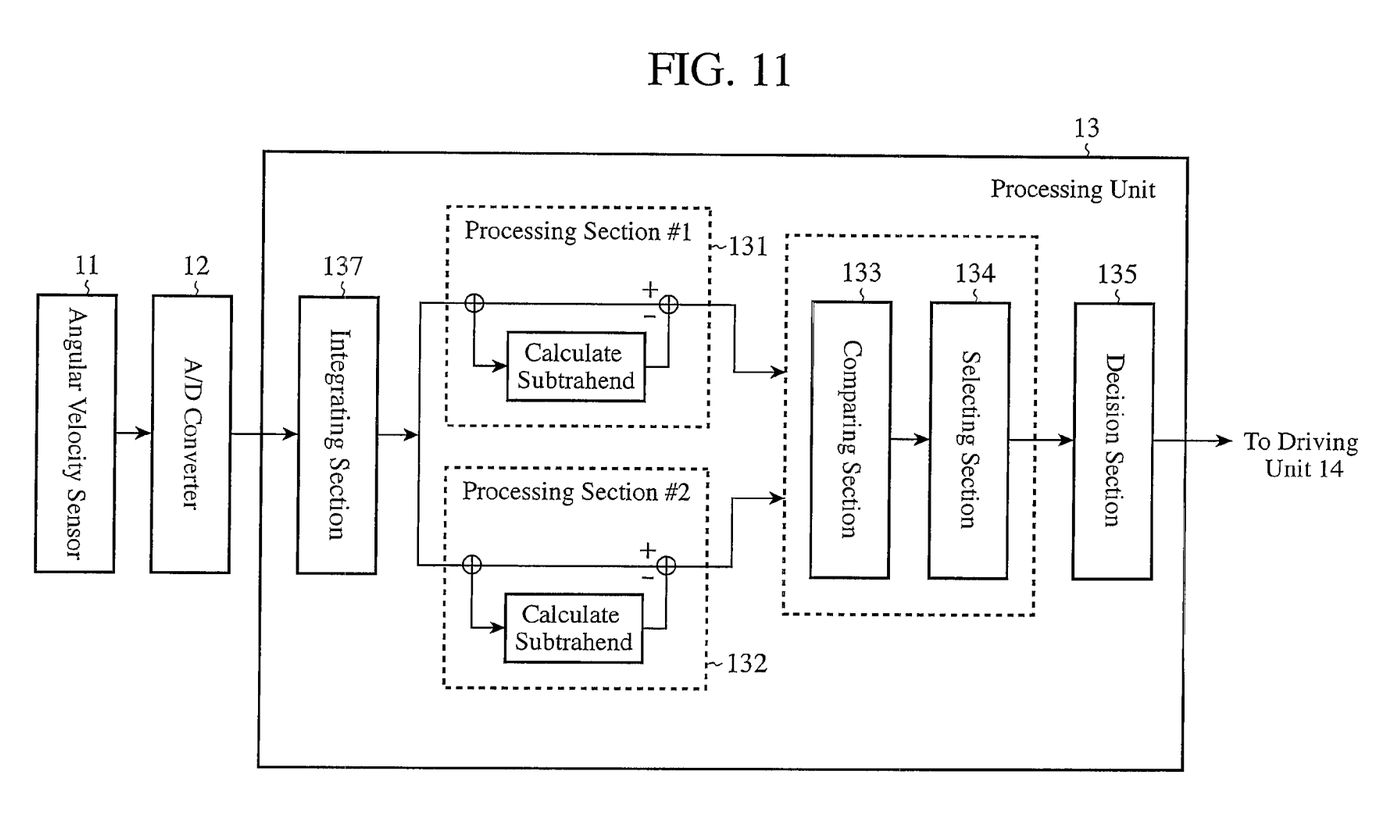
FIG. 11 is a block diagram showing by developing in accordance with functions an internal configuration of the processing unit of a starting device of an occupant protective system of an embodiment 3 in accordance with the present invention.

FIG. 11 is a block diagram showing an internal configuration of the processing unit 13 by developing in accordance with functions in the starting device of the occupant protective system of an embodiment 3 in accordance with the present invention.

It differs from the embodiment 1 shown in FIG. 3 in that it has an integrating section 137 added to the input stage of the processing section 131 and processing section 132 for integrating the physical quantity output from the angular velocity sensor 11. Since it has the same configuration as the embodiment 1 shown in FIG. 3 except for the addition of the integrating section 137, only the integrating section 137 will be described below. Incidentally, in FIG. 11, blocks designated by the same reference numerals as the blocks of FIG. 3 are assumed to have the same names and functions as the blocks of FIG. 3.

Figure 12:
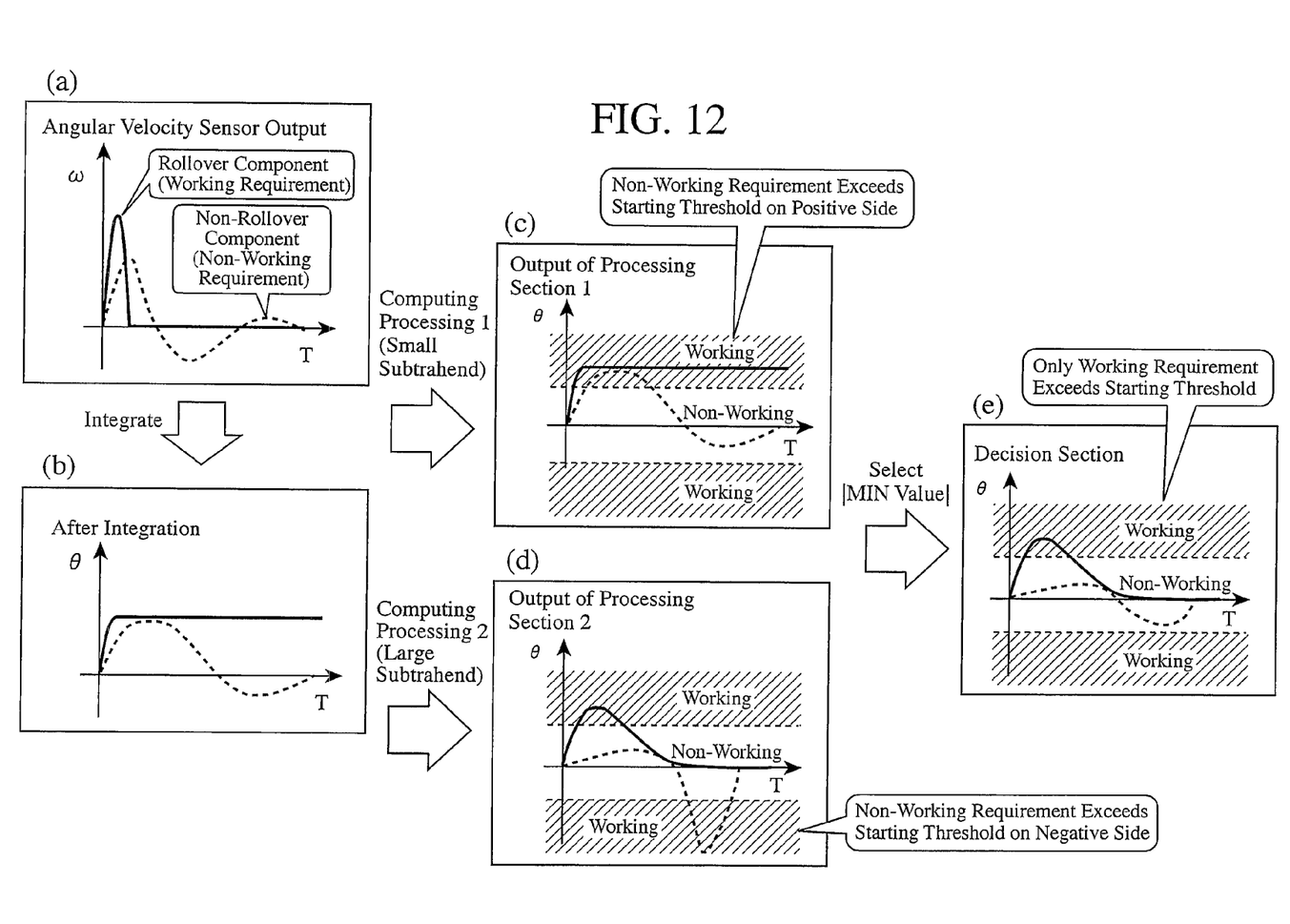
FIG. 12 is an operational schematic diagram showing a series of operations conceptually from an angular velocity sensor output to a starting decision by the processing unit shown in FIG. 11.

FIG. 12 is an operational schematic diagram showing a procedure from the output of the angular velocity sensor 11 to the starting decision of the air bag 2 by the decision section 135 conceptually as to the operation of the processing unit 13 shown in FIG. 11. In FIG. 12, solid lines indicate a rollover phenomenon (working requirement), and broken lines indicate a non-rollover phenomenon (non-working requirement) in which a rollover does not occur, thereby returning to the original state.

The integrating section 137, integrating the output of the angular velocity sensor 11 shown in FIG. 12(a), generates the integral waveform with the angle (θ) versus time (T) characteristics of FIG. 12(b), and supplies to the processing section 131 and processing section 132. Since the non-working requirement does not differ in terms of the integral waveforms, the integral values cannot discern from the integral waveforms whether the vehicle rolls over or not.

FIGS. 12(c) and 12(d) show output values after the processing section 131 and processing section 132 perform the subtraction for the integral values shown in FIG. 12(b). As shown in FIG. 12(c), in the processing section 131 having a subtrahend set at a small value, the non-working requirement is large on the positive side and exceeds the starting threshold. In contrast, in the processing section 132 having a subtrahend set at a large value, a large overshoot component occurs on the negative side so that the non-working requirement exceeds the starting threshold on the negative side greatly.

However, since the selecting section 134 selects the subtraction output with the minimum absolute value (the processing section 132 in the first half output signal section, and the processing section 131 in the second half output signal section), only the working requirement exceeds the starting threshold as shown in FIG. 12(e), thereby being able to maintain the non-working region.

As described above, according to the starting device of the occupant protective system of the embodiment 3 in accordance with the present invention, the power of making distinctions between the rollover component and the non-rollover component is improved by integrating the output of the angular velocity sensor 11 and by comparing and selecting, after the subtraction of the processing section 131 and processing section 132, their absolute values, which makes it possible to start the occupant protective system because of the accumulation results of the physical quantity even as to the requirements that do not reach the starting threshold.

As described above, the starting device of the occupant protective system of the embodiment 3 in accordance with the present invention is constructed, as shown in the embodiments 1, 2 and 3 of FIG. 3, FIG. 9 and FIG. 11, from the angular velocity sensor 11 (or acceleration sensor) for detecting the behavior of the vehicle, the processing sections 131 and 132 for performing two or more computations with different subtrahends on the physical quantity based on the output from the sensor 11, the comparing section 133 for comparing the absolute values of the outputs from the individual processing sections 131 and 132, the selecting section 134 for selecting the output value of the processing sections 131 and 132 with the minimum absolute value, and the decision section 135 for making a decision as to the necessity for starting the occupant protective system from the selected output value. Thus, it provides the starting device of the occupant protective system capable of eliminating the drift component quickly which occurs temporarily owing to environmental changes, and capable of eliminating offset in such a manner as to prevent an overshoot from occurring in the second half of the output signal with respect to the target physical phenomenon.

In addition, the starting of the air bag 2 based on the accumulation result of the physical quantity becomes possible even in a case where the physical quantity does not reach the starting threshold singly by inserting the integrating section 136 between the selecting section 134 and the decision section 135 and by integrating the outputs of the processing section 131 and processing section 132 as shown in the embodiment 2 of FIG. 9, or by integrating the physical quantity acquired by the angular velocity sensor 11 with the integrating section 137 and by supplying to the processing section 131 and processing section 132 as shown in the embodiment 3 of FIG. 11. In addition, it improves the power of making distinctions between the rollover component and the non-rollover component, and enables the starting of the occupant protective system based on the accumulation result of the physical quantity even for the requirement that does not reach the starting threshold.

Incidentally, the foregoing embodiments 1-3 in accordance with the present invention are described by way of example having only the angular velocity sensor 11 as a sensor for detecting the behavior of the vehicle, it is obvious that they are applicable to starting the occupant protective system for a frontal collision or a side collision with the acceleration being set as a target by using an acceleration sensor.

In addition, as for the functions of the blocks constituting the starting device of the occupant protective system of the foregoing embodiments in accordance with the present invention, all of them can be implemented by software, or at least part of them can be implemented by software. For example, the data processing in the processing unit 13 (processing section 131, processing section 132, comparing section 133, selecting section 134, decision section 135, and integrating section 136 or 137) can be implemented by one or more programs on a computer, or at least part of them can be realized by hardware.

INDUSTRIAL APPLICABILITY

As described above, the starting device of the occupant protective system in accordance with the present invention is suitable for an air bag starting device and the like for a vehicle because it can quickly eliminate the drift component occurring temporarily and prevent the overshoot from occurring by making a decision as to the necessity for starting in accordance with the output value with the minimum absolute value among the results of the computing processing performed for two or more different subtrahends.

What is claimed is:

1. A starting device of an occupant protective system comprising:
   a sensor for detecting and outputting angular velocity of a vehicle, or acceleration of the vehicle;
   at least two processing sections for performing subtractions with different subtrahends on a physical quantity based on the sensor output;
   a comparing section for comparing absolute values of outputs from the at least two processing sections;
   a selecting section for selecting a minimum absolute value from the absolute values compared by the comparing section; and
   a decision section for making a decision as to necessity for starting the occupant protective system in accordance with the selected minimum absolute value.

2. The starting device of the occupant protective system according to claim 1, further comprising an integrating section for integrating the physical quantity, and supplies to the processing sections as their input.

3. The starting device of the occupant protective system according to claim 1, further comprising an integrating section for integrating the minimum absolute value selected by the selecting section, and supplies to the decision section as its input.

4. The starting device of the occupant protective system according to claim 1, wherein the processing sections vary the subtrahends in accordance with the physical quantity based on the sensor output.

5. The starting device of the occupant protective system according to claim 1, wherein the processing sections perform subtractions using fixed subtrahends.

* * * * *